(12) United States Patent
Kim

(10) Patent No.: US 6,804,303 B2
(45) Date of Patent: Oct. 12, 2004

(54) APPARATUS AND METHOD FOR INCREASING DEFINITION OF DIGITAL TELEVISION

(75) Inventor: In Hoon Kim, Taegu-shi (KR)

(73) Assignee: LG Electronics, Inc., Seoul (KR)

( * ) Notice: Subject to any disclaimer, the term of this patent is extended or adjusted under 35 U.S.C. 154(b) by 624 days.

(21) Appl. No.: 09/917,820

(22) Filed: Jul. 31, 2001

(65) Prior Publication Data

US 2002/0031187 A1 Mar. 14, 2002

(30) Foreign Application Priority Data

Aug. 1, 2000 (KR) ........................................ 2000-44624

(51) Int. Cl.⁷ ................................................ H04N 7/12
(52) U.S. Cl. ................................................ 375/240.16
(58) Field of Search .................... 375/240.25, 240.16, 375/240.02, 240.12, 240.23; 348/407.1, 413.1, 416.1, 451, 446, 452, 456; H04N 7/12

(56) References Cited

U.S. PATENT DOCUMENTS

| | | | | |
|---|---|---|---|---|
| 5,394,190 A | * | 2/1995 | Yamada | 348/411.1 |
| 5,398,078 A | * | 3/1995 | Masuda et al. | 348/699 |
| 5,412,430 A | * | 5/1995 | Nagata | 348/402.1 |
| 5,689,306 A | * | 11/1997 | Jung | 375/240.16 |
| 5,719,630 A | * | 2/1998 | Senda | 375/240.17 |
| 5,986,713 A | * | 11/1999 | Odaka et al. | 375/240.14 |
| 6,483,876 B1 | * | 11/2002 | Chang et al. | 375/240.16 |
| 6,553,068 B1 | * | 4/2003 | Wake et al. | 375/240.14 |

* cited by examiner

Primary Examiner—Nhon Diep
(74) Attorney, Agent, or Firm—Fleshner & Kim, LLP

(57) ABSTRACT

An apparatus and method for improving picture quality of a digital television is disclosed in which a picture image motion adaptive interpolation process is used when an interlaced picture is converted to a progressive picture, thereby providing optimal picture quality.

19 Claims, 5 Drawing Sheets

N Field

N+1 or N−1 Field

After temporal axis interpolation

N Field

After perpendicular axis interpolation

APPARATUS AND METHOD FOR INCREASING DEFINITION OF DIGITAL TELEVISION

BACKGROUND OF THE INVENTION

1. Field of the Invention

The present invention relates to a digital television, and more particularly, to an apparatus and method for improving picture quality of a digital television.

2. Background of the Related Art

Generally, unlike an interlaced scan video image, a progressive scan video image has a higher vertical resolution of about 30%, no horizontal scanning line, and no flickering, thereby being more stable and straining less a viewer's eyes. The interlaced scan video image has a problem of easily straining the eyes of a viewer as intervals between scanning lines become larger. This problem is more apparent in large-sized screens, in which resolution is reduced.

Therefore, progressive scanning is essential in 3-tube projection televisions or projectors as well as high quality projection televisions or projectors. Furthermore, since progressive scanning improves the resolution on a temporal axis, progressive scanning is more effective in screens with actively dynamic picture images.

The aforementioned interlaced scan video image and progressive scan video image will now be described in detail.

In an interlaced scan video image, when supposing that two scanning lines A and B are vertically adjacent and that an image temporally moves from frame No.1 to frame No.2, in a static picture image, a video image has very little information on motion, thus no particular difference in information between line A and line B of frame No.1 or frame No.2 will be present.

In a dynamic picture image whereby an object is in motion, a portion of the information on line A and line B of frame No.2 may be changed from the information on line A and line B of frame No.1 or the object itself may change showing a completely different image. Thus, the overall information on line A and line B on frame No.2 is different from the overall information on line A and line B on frame No.1, which is very common when viewing television.

However, when supposing that an object moves very slightly within an identical picture image, the information on line A of frame No.2 is identical to the information on line A of frame No.1, but the information on line B of frame No.2 is different from the information of line B of frame No.1. In this case, when using an interlaced method in which the distance between line A and line B is great, pixels of the upper and lower lines A and B cannot be easily connected. Therefore, when the motion of the object is slow and small, the difference is not obvious, however, when the motion of the object is fast and large, then the resolution of the picture image is reduced and the picture image becomes unclear. In an interlaced image, especially when the video image is dynamic, a jagged edge effect, whereby a diagonal outline of an object seems jagged like a pitch wheel, may occur.

In a progressive scan video image, another scanning line is added between line A and line B of the aforementioned interlaced scan video image to improve luminance of a picture image. When the picture image is dynamic, the jagged edge effect does not occur and the pixels are more easily connected.

In other words, either a temporal axis interpolation process, which inputs information of a previous frame or a following frame, as shown in FIGS. 1A to 1C, or a perpendicular axis interpolation process, which inputs information of a lower scanning line or an upper scanning line right below or above the identical frames, as shown in FIGS. 2A and 2B, is selectively adapted.

In the temporal axis interpolation process, as shown in FIG. 3, a static image has a noticeably improved resolution and provides a much more stable video image. In the perpendicular axis interpolation process, as shown in FIG. 4, a dynamic image provides a clear video image without motion artifact noise or jagged edge effect.

Therefore, either the temporal axis interpolation process or the perpendicular axis interpolation process of the progressive scanning method is selectively used in a technique for recently improved high-quality display devices.

However, when the temporal axis interpolation process of the progressive scanning method is used, problems arise in that the jagged edge effect occurs in a dynamic image, unclear picture image also occurs, and motion artifact noise, which is typical in the progressive scanning method, increases. On the other hand, when the perpendicular axis interpolation process is used, problems arise in that indefinite outline occurs in a static picture image and a softness effect, whereby the picture image seems more or less unclear, occurs as well.

SUMMARY OF THE INVENTION

Accordingly, the present invention is directed to an apparatus and method for improving picture quality of a digital television that substantially obviates one or more problems due to limitations and disadvantages of the related art.

An object of the present invention is to provide an apparatus and method for improving picture quality of a digital television in which a picture image motion adaptive interpolation process is used when an interlaced picture is converted to a progressive picture, thereby providing optimal picture quality.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, an apparatus for improving picture quality of a digital television includes a variable length decoder which receives compressed MPEG-2 digital video streams through a first in first out (FIFO) buffer and calculates compressed values of picture images with different compressed values, a picture image reconstructing unit which processes the digital video streams input through the variable length decoder with run length decoding, inverse scan, inverse quantization, and 8×8 inverse discrete cosine transform (IDCT) to restore the video streams back to their initial states and reconstruct the video streams to a picture image with sampled values of Y/Cb/Cr, a motion compensator which extracts a motion vector from the picture image corresponding to the previous frame input through a reference buffer, extracts a motion vector from the picture output from the picture image reconstructing unit, compares a difference value between the extracted motion values with a set value to selectively apply a temporal axis interpolation process or a perpendicular axis interpolation process, and carries out progressive scanning, a storage buffer which stores picture images output from the motion compensator, and a format converter which converts the picture images stored in the storage buffer to a display format and outputs the converted picture images.

In another aspect of the present invention, a method for improving picture quality of a digital television includes the steps of restoring compressed video streams and to reconstruct a picture image, extracting a motion vector from the reconstructed picture image and extracting a motion vector from the picture image corresponding to a previous frame, calculating a difference value between the two motion vectors, applying either a temporal axis interpolation process or a perpendicular axis interpolation process according to a comparison result between the difference value and a set value and to carry out progressive scanning, and displaying the scanned picture image.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings.

DETAILED DESCRIPTION OF THE PREFERRED EMBODIMENTS

Reference will now be made in detail to the preferred embodiments of the present invention, examples of which are illustrated in the accompanying drawings.

Figure 1A:
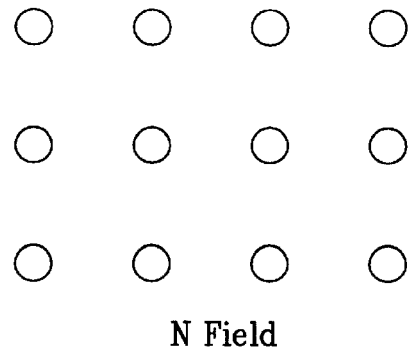
FIGS. 1A to 1C illustrate a general concept of a temporal axis interpolation process of a progressive scanning method.
Figure 1B:
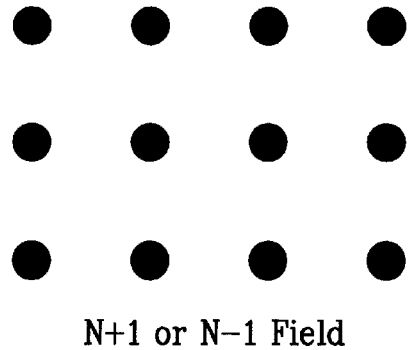
Figure 1C:
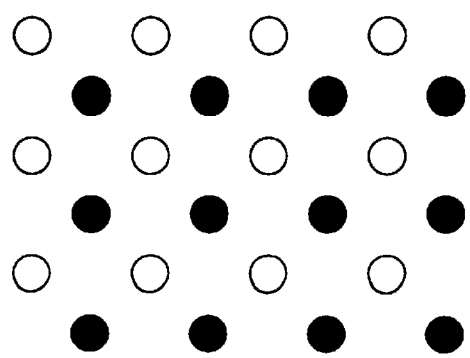
Figure 2A:
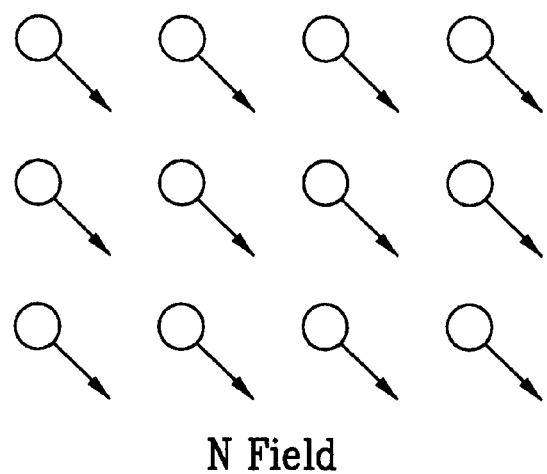
FIGS. 2A and 2B illustrate a general concept of a perpendicular axis interpolation process of a progressive scanning method.
Figure 2B:
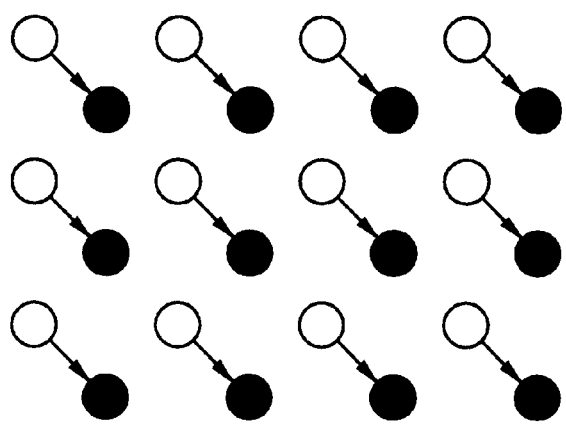
Figure 3:
FIG. 3 illustrates an improved picture quality of a still picture image according to the temporal axis interpolation process of FIG. 1.
Figure 3:
Figure 4:
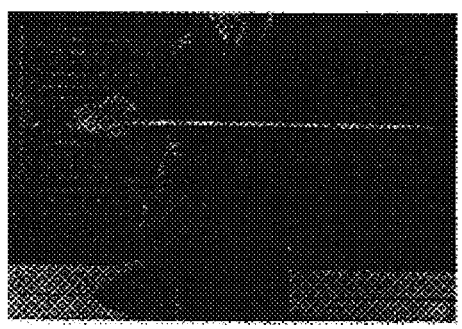
FIG. 4 illustrates an improved picture quality of a still picture image according to the perpendicular axis interpolation process of FIG. 2.
Figure 4:
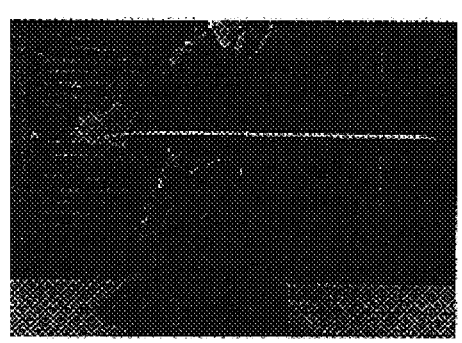
Figure 5:
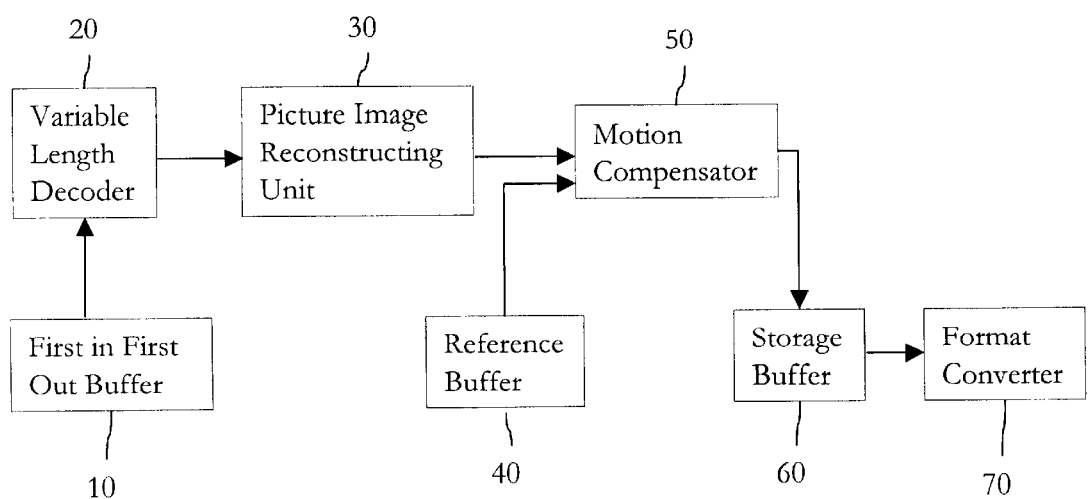
FIG. 5 is a block diagram showing an apparatus for improving picture quality of a digital television according to one embodiment of the present invention.

As shown in FIG. 5, an apparatus for improving picture quality of a digital television according to the present invention includes a variable length decoder 20 which receives compressed MPEG-2 digital video streams through a FIFO buffer 10 and calculates compressed values of picture images with different compressed values, a picture image reconstructing unit 30 which processes the digital video streams input through the variable length decoder 20 with run length decoding, inverse scan, inverse quantization, and 8×8 IDCT to restore the digital video streams to their initial states and to reconstruct the video streams to a picture image with sampled values of Y/Cb/Cr, a motion compensator 50 which extracts a motion vector from the picture image corresponding to the previous frame input through a reference buffer 40, extracts a motion vector from the picture image output from the image reconstructing unit 30, compares a difference value between the extracted motion vector values with a set value to selectively apply a temporal axis interpolation process or a perpendicular axis interpolation process, and carries out progressive scanning, a storage buffer 60 which stores picture images output from the motion compensator 50, and a format converter 70 which converts the picture images stored in the storage buffer 60 to a display format and outputs the converted picture images.

Figure 6:
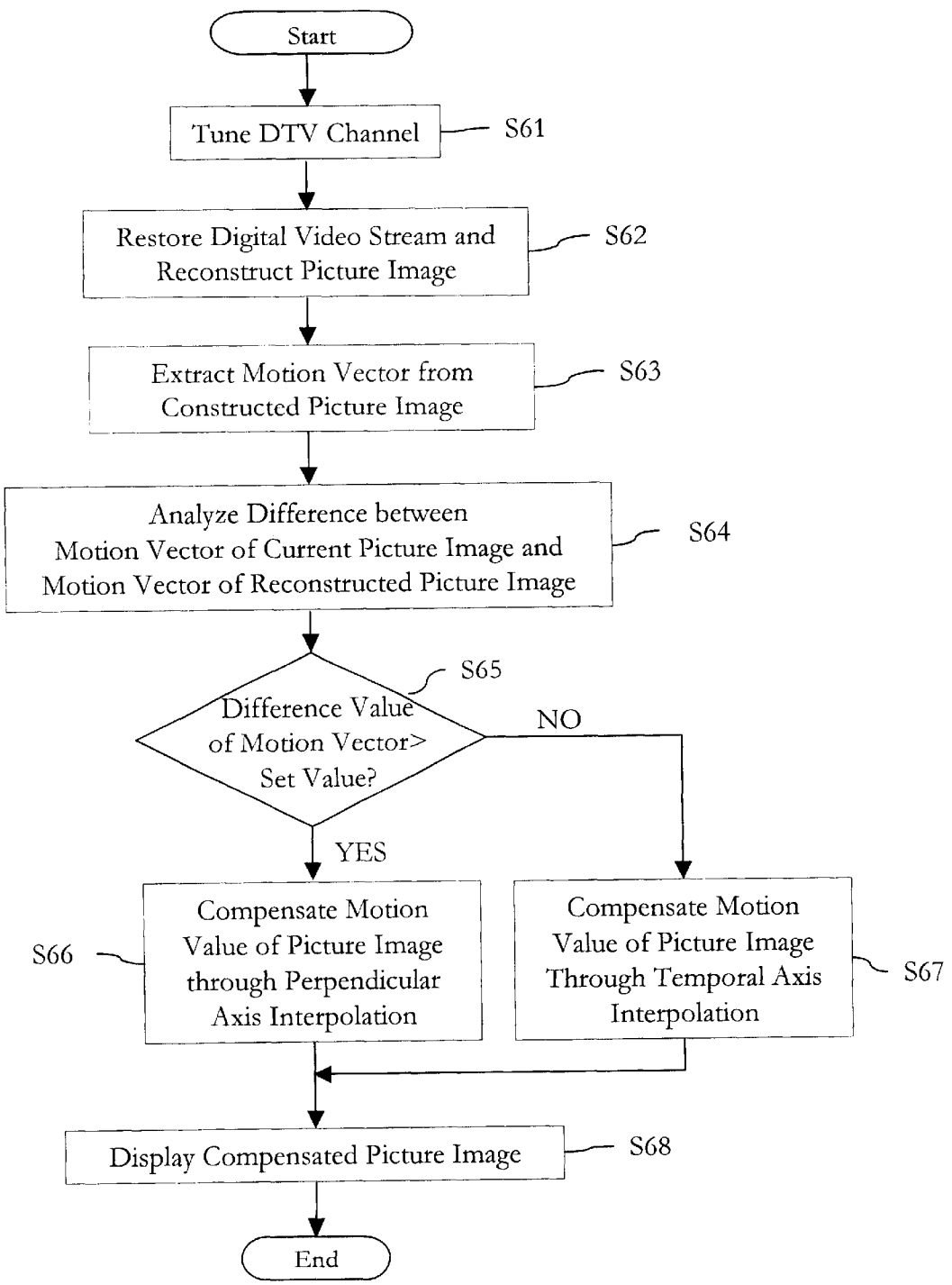
FIG. 6 is a flow chart showing a method for improving picture quality of a digital television according to one embodiment of the present invention.

The operation of the aforementioned apparatus for improving picture quality of a digital television according to one embodiment of the present invention will now be described with reference to FIG. 6.

First, a viewer tunes a channel of a digital television (S61).

Then, MPEG-2 video streams of the tuned channel are input to the variable length decoder 20 through the FIFO buffer 10, and a compressed value of each picture image with different compressed values is calculated. The digital video streams, which are output from the variable length decoder 20, are input to the picture image reconstructing unit 30 whereby run length decoding, inverse scanning, inverse quantization, and 8×8 IDCT are processed to restore the video streams to their initial states prior to compression and to reconstruct the video streams.

Subsequently, the motion compensator 50 extracts motion vectors from the picture images reconstructed by the picture image reconstructing unit 30 (S63). Additionally, the motion compensator 50 receives from the reference buffer 40 information on the picture images output to a previous frame, to extract corresponding motion vectors and calculate a difference value of the extracted motion vectors (S64).

Afterwards, it is determined whether the difference value is greater than the set value (S65). If the difference value is greater than the set value, then a perpendicular axis interpolation process is applied to carry out progressive scanning, which compensates picture image motion (S66). On the other hand, if the difference value is smaller than the set value, then a temporal axis interpolation process is applied to carry out progressive scanning, which compensates picture image motion (S67).

In case of the temporal axis interpolation process, information of a frame preceding or following the current frame is input for interpolation, and in case of the perpendicular axis interpolation process, information of a lower or upper scanning line right below or above identical frames is input for interpolation, thus allowing the process of a motion-adaptive progressive scanning.

A picture image output from the motion compensator 50 is stored in the storage buffer 60 and then converted into a format suitable for display by the format converter 70 and then output (S68).

As aforementioned, the apparatus and method for improving picture quality of a digital television according to the present invention has the following advantage.

The temporal axis interpolation process and the perpendicular axis interpolation process are used in accordance with motion vectors of a picture image when converting interlaced scanning to progressive scanning, so that improved picture quality and stable picture image can be provided.

The foregoing embodiments are merely exemplary and are not to be construed as limiting the present invention. The present teachings can be readily applied to other types of apparatuses. The description of the present invention is intended to be illustrative, and not to limit the scope of the claims. Many alternatives, modifications, and variations will be apparent to those skilled in the art.

What is claimed is:

1. An apparatus for improving picture quality of a digital television comprising:
   a variable length decoder which receives compressed MPEG-2 digital video streams through a first in first out (FIFO) buffer and calculates compressed values of picture images with different compressed values;
   a picture image reconstructing unit which processes the digital video streams input through the variable length decoder with run length decoding, inverse scan, inverse quantization, and 8×8 inverse discrete cosine transform (IDCT) to restore the video streams back to their initial states and reconstruct the video streams to a picture image with sampled values of Y/Cb/Cr;
   a motion compensator which extracts a motion vector from the picture image corresponding to the previous frame input through a reference buffer, extracts a motion vector from the picture image output from the picture image reconstructing unit, compares a difference value between the extracted motion values with a set value to selectively apply a temporal axis interpolation process or a perpendicular axis interpolation process, and carries out progressive scanning;
   a storage buffer which stores picture images output from the motion compensator; and
   a format converter which converts the picture images stored in the storage buffer to a display format and outputs the converted picture images.

2. A method for improving picture quality of a digital television, the method comprising the steps of:
   (a) restoring compressed video streams to reconstruct a picture image;
   (b) extracting a motion vector from the reconstructed picture image and extracting a motion vector from the picture image corresponding to a previous frame;
   (c) calculating a difference value between the two motion vectors;
   (d) applying either a temporal axis interpolation process or a perpendicular axis interpolation process according to a comparison result between the difference value and a set value to carry out progressive scanning; and
   (e) displaying the scanned picture image.

3. The method of claim 2, wherein the step (d) includes the steps of carrying out progressive scanning by applying the temporal axis interpolation process when the difference value is smaller than the set value, and carrying out progressive scanning by applying the perpendicular axis interpolation process when the difference value is greater than the set value.

4. A method of motion-compensating images in a digital television receiver, the method comprising:
   obtaining a first motion vector from a current image frame and a second motion vector from a previous image frame;
   calculating a difference between the first and second motion vectors;
   selecting one of a plurality of interpolation schemes based on a comparison between the difference and a predetermined value; and
   motion-compensating the current image frame by using the selected interpolation scheme.

5. The method of claim 4, further comprising:
   storing the motion-compensated current image frame in a buffer; and
   converting the stored image frame into displayable image data.

6. The method of claim 5, further comprising displaying the converted displayable image data on a display screen.

7. The method of claim 4, wherein the plurality of interpolation schemes includes a vertical interpolation and a temporal interpolation.

8. The method of claim 4, wherein the selecting one of a plurality of interpolation schemes includes selecting a vertical interpolation when the difference between the first and second motion vectors is greater than the predetermined value.

9. The method of claim 4, wherein the selecting one of a plurality of interpolation schemes includes selecting a temporal interpolation when the difference between the first and second motion vectors is less than or equal to the predetermined value.

10. The method of claim 4, wherein the motion-compensating the current image frame includes motion-compensating the current image frame using pixel values of the current image frame when the difference between the first and second motion vectors is greater than the predetermined value.

11. The method of claim 4, wherein the motion-compensating the current image frame includes motion-compensating the current image frame using pixel values of at least one of the previous image frame and a next image frame when the difference between the first and second motion vectors is less than or equal to the predetermined value.

12. A motion-adaptive digital television receiver comprising:
   a picture image reconstructing unit receiving digital video streams and reconstructing (N−1)th, Nth, and (N+1)th image frames; and
   a motion compensator coupled to the picture image reconstructing unit for calculating a difference between first and second motion vectors obtained from the Nth and (N−1)th image frames, respectively, and for selecting one of a plurality of interpolation schemes based on a comparison between the difference and a predetermined value, wherein the motion compensator compensates a motion of the Nth image frame using the selected interpolation scheme.

13. The digital television receiver of claim 12, further comprising:
   a first buffer storing the (N−I)th image frame reconstructed by the picture image reconstruction unit;
   a second buffer coupled to the motion compensator for storing the motion-compensated Nth image frame; and
   a format converter coupled to the motion compensator for converting the Nth image frame stored in the second buffer into displayable image data.

14. The digital television receiver of claim 13, further comprising a display screen coupled to the format converter for displaying the converted displayable image data.

15. The digital television receiver of claim 12, wherein the plurality of interpolation schemes includes a vertical interpolation and a temporal interpolation.

16. The digital television receiver of claim 12, wherein the motion compensator selects a vertical interpolation when the difference between the first and second motion vectors is greater than the predetermined value.

17. The digital television receiver of claim 12, wherein the motion compensator selects a temporal interpolation when the difference between the first and second motion vectors is less than or equal to the predetermined value.

18. The digital television receiver of claim 12, wherein the motion compensator compensates the motion of the Nth image frame using pixel values of the Nth image frame when the difference between the first and second motion vectors is greater than the predetermined value.

19. The digital television receiver of claim 12, wherein the motion compensator compensates the motion of the Nth image frame using pixel values of at least one of the (N−1)th and (N+1)th image frames when the difference between the first and second motion vectors is less than or equal to the predetermined value.

* * * * *